United States Patent
McGarvey et al.

(10) Patent No.: US 10,681,266 B2
(45) Date of Patent: Jun. 9, 2020

(54) METHOD, APPARATUS, AND SYSTEM FOR PROCESSING DIGITAL IMAGES

(71) Applicant: Carl Zeiss AG, Oberkochen (DE)

(72) Inventors: James E. McGarvey, Hamlin, NY (US); Harshesh Valera, Surrey (CA)

(73) Assignee: Carl Zeiss AG, Oberkochen (DE)

(*) Notice: Subject to any disclaimer, the term of this patent is extended or adjusted under 35 U.S.C. 154(b) by 0 days.

(21) Appl. No.: 16/006,637

(22) Filed: Jun. 12, 2018

(65) Prior Publication Data
US 2019/0379824 A1 Dec. 12, 2019

(51) Int. Cl.
| | |
|---|---|
| H04N 5/232 | (2006.01) |
| H04N 5/357 | (2011.01) |
| H04N 5/345 | (2011.01) |
| H04N 5/38 | (2006.01) |
| H04N 5/907 | (2006.01) |

(52) U.S. Cl.
CPC ......... *H04N 5/23229* (2013.01); *H04N 5/345* (2013.01); *H04N 5/357* (2013.01); *H04N 5/38* (2013.01); *H04N 5/907* (2013.01)

(58) Field of Classification Search
CPC ...... H04N 5/23229; H04N 5/907; H04N 5/38; H04N 5/357; H04N 5/345
USPC ...................................... 348/207.1
See application file for complete search history.

(56) References Cited

U.S. PATENT DOCUMENTS

| | | | |
|---|---|---|---|
| 5,903,707 A | 5/1999 | Sato et al. | |
| 6,148,118 A | 11/2000 | Murakami et al. | |
| 6,292,218 B1 | 9/2001 | Parulski et al. | |
| 7,292,267 B2 | 11/2007 | Prentice et al. | |
| 2008/0049037 A1* | 2/2008 | Kurupati | G06T 1/60 345/560 |
| 2010/0260428 A1* | 10/2010 | Ueno | H04N 19/80 382/232 |
| 2012/0206620 A1 | 8/2012 | Findlay et al. | |
| 2015/0097980 A1 | 4/2015 | Cucci et al. | |
| 2016/0157715 A1* | 6/2016 | De Boer | A61B 3/0025 351/206 |

* cited by examiner

*Primary Examiner* — Yogesh K Aggarwal
(74) *Attorney, Agent, or Firm* — Falk Ewers; Ewers IP Law PLLC

(57) ABSTRACT

A method, an image pre-processing apparatus, and a camera system for processing large images are provided. The method includes receiving from an image sensor an image frame at an image pre-processing apparatus, the image frame having a frame pixel resolution substantially equal to a sensor pixel resolution of the image sensor, dividing the image frame into first and second image subframes to be sequentially processed by an image signal processor, each of the first and the second image subframes having a subframe pixel resolution smaller than the sensor pixel resolution and a region in which the first and second image subframes overlap with each other. The subframe pixel resolution is predetermined by a processing capacity of the image signal processor, and the first and the second image subframes are consecutively processed by the image signal processor.

32 Claims, 5 Drawing Sheets

METHOD, APPARATUS, AND SYSTEM FOR PROCESSING DIGITAL IMAGES

TECHNICAL FIELD

The invention relates to processing of digital images, and, in particular, to processing large digital images with a high pixel resolution in a still image mode. Further, the invention relates to an apparatus and a system performing processing of digital images.

BACKGROUND

Digital cameras include image sensors to capture digital images and are generally operated in still image mode or live view mode. Different techniques may be used to produce still images and live view images. While it is important to produce still images with a high quality, images for live view or preview may be generated with less but still acceptable image quality.

Image sensors typically detect a light intensity per pixel. To allow color information to be recorded, color filters may be bonded to the substrate of the image sensor which allocate a certain color to a certain pixel, and each pixel detects the light intensity for the specific color. A typical pattern for a color filter used in digital cameras is a Bayer filter. A Bayer filter contains alternating rows of red and green filters and blue and green filters, wherein each row contains alternating red and green filters and blue and green filters, respectively. Green filters preferentially allow green light photons to pass to the detector (e.g., a photodiode) of the respective pixel of the image sensor. At the same time, red and blue light photons that arrive at the green filter are not transmitted by the filter and, therefore, not detected by the respective detector. Similarly, red filters preferentially allow red light photons and blue filters allow only blue light photons to pass to the respective detector.

Each image frame has an image pixel resolution that depends on a pixel resolution of the image sensor and generally describes the detail of information that a digital image contains. In other words, by increasing the image pixel resolution, the level of detail in the image can be increased. The pixel resolution of an image frame is typically described by a number of pixel columns (image width) and a number of pixel rows (image height) which result in a number of total pixels that need to be processed by the specialized image processor.

When a Bayer filter is applied in front of an image sensor, the resulting image frame produced by the image sensor needs to be interpolated or demosaiced to generate all three colors for each pixel so that the digital image can be displayed, printed or stored.

In digital cameras, interpolating or demosaicing may be performed by specialized image signal processors (ISPs) but also by general purpose processors (CPUs) which execute image processing software programs.

The process of interpolating or demosaicing can be very complex depending on the effectiveness of the mathematical algorithms used in particular because of the much higher number of pixels that need to be processed in still image mode. U.S. Pat. No. 6,292,218 B1 describes an electronic camera in which the more complex digital techniques for generating a high quality still image are implemented in software and executed on a CPU, whereas the less complex techniques for producing preview images of acceptable quality are implemented in an application specific integrated circuit (ASIC).

However, utilizing a CPU for still image processing may significantly increase the cost of manufacturing high resolution digital cameras. On the other hand, processing still images with ISPs that have correspondingly high processing capabilities may also result in significantly higher manufacturing costs for the digital camera. Therefore, new approaches are needed which allow the use of ISPs with relatively low processing capabilities to also process full resolution high quality still image frames without the need of a CPU for image processing, such as interpolating and demosaicing.

SUMMARY

It is therefore an object of the invention to provide a method, an image processing apparatus, and a system for processing large digital images with a high pixel resolution in a still image mode by an image signal processor with a limited processing capacity.

According to a first aspect of the invention, a method for processing digital images is provided in which an image frame is received from an image sensor at an image pre-processing apparatus. The image frame has a frame pixel resolution substantially equal to a sensor pixel resolution of the image sensor. A frame pixel resolution that is substantially equal to the sensor pixel resolution in this disclosure may include frame pixel resolutions that are equal to the sensor pixel resolution and frame pixel resolutions that slightly deviate from the sensor pixel resolution. In particular, substantially equal means that the frame pixel resolution can be slightly smaller than the sensor pixel resolution because some image frame rows and/or image frame columns are omitted from the full sensor pixel resolution. The image frame is divided into at least two image subframes to be sequentially processed by an image signal processor. Thereafter, the at least two image subframes are consecutively processed by the image signal processor.

According to a second aspect of the invention, an image pre-processing apparatus is provided which includes an image data receiver configured to receive an image frame from an image sensor, the image frame having a frame pixel resolution substantially equal to a sensor pixel resolution of the image sensor. The image pre-processing apparatus further includes a data interface, an imager data interface, and a direct memory access (DMA) controller in communication with the image data receiver, the data interface, and the imager data interface. The DMA controller is configured to store the image frame to a buffer memory via the data interface, to receive first and second image subframes being generated from the image frame by dividing the image frame into the first and second image subframes to be processed by an image signal processor, and to consecutively transmit the first and second subframes to the image signal processor via the imager data interface.

Each of the first and the second image subframes have a subframe pixel area that is smaller than the sensor pixel resolution and a region in which the first and second image subframes overlap with each other. The subframe pixel resolution is predetermined by a processing capacity of the image signal processor.

According to a third aspect of the invention, a camera system for processing digital images is provided. The camera system includes an image sensor, an image pre-processing apparatus in communication with the image sensor, an image processing apparatus in communication with the pre-processing apparatus and including a buffer memory and an image signal processor; and a display connected to the image processing apparatus. The image pre-processing apparatus includes an image data receiver configured to receive an image frame from the image sensor, the image frame having a frame pixel resolution substantially equal to a sensor pixel resolution of the image sensor, a data interface and an imager data interface, and a direct memory access (DMA) controller in communication with the image data receiver, the data interface, and the imager data interface. The DMA controller is configured to store the image frame to the buffer memory via the data interface, to receive first and second subframes being generated from the image frame, and to consecutively transmit the first and second subframes to the image signal processor via the imager data interface.

As a result, the use of an image pre-processing apparatus according to an aspect of the invention allows the use of pre-manufactured image processing apparatuses that have ISPs thereon with processing capabilities that would, without the operations performed by the image pre-processing apparatus, only be capable of processing downsized preview image frames, but not high resolution still image frames.

BRIEF DESCRIPTION OF THE DRAWINGS

The invention will now be described with reference to the drawings, wherein.

DESCRIPTION OF EXEMPLARY EMBODIMENTS

Figure 1:
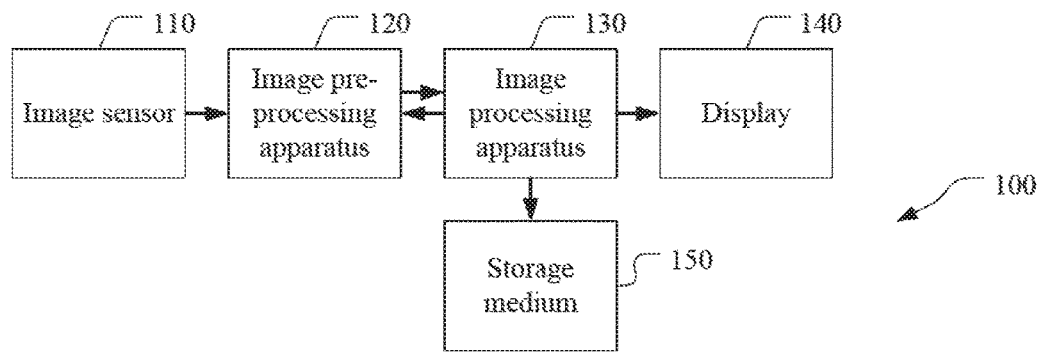
FIG. 1 shows a schematic illustration of a camera system for processing digital images according to an exemplary embodiment of the invention.

FIG. 1 shows a camera system 100 for processing digital images according to an exemplary embodiment of the invention. The camera system 100 includes an image sensor 110, an image pre-processing apparatus 120, and an image processing apparatus 130 to which a display 140 and a storage medium 150 are connected.

The image sensor 110 can be operated in a live view mode and in a still capture mode. In both modes, the full active area of the image sensor 110 is utilized, and an image frame is generated and outputted by the image sensor 110 to the image pre-processing apparatus 120. As described in more detail below, for previewing live view or still capture preview, the image frame is downsized by the image pre-processing apparatus 120 to enable a high frame rate. For still image capture, however, all lines and columns of the image frame are processed without downsizing.

Live view images and capture view images are displayed in display 140. The display 140 may include an electronic view finder (EVF) that is connected to the image processing apparatus 130 via an MIPI display serial interface (MIPI DSI) (not shown) specified by the Mobile Industry Processor Interface (MIPI) Alliance, but is not limited thereto. The display 140 may also include a back display of the digital camera (not shown) that is also connected to the image processing apparatus 130 via an MIPI.

The storage medium 150 is a non-transitory computer readable storage medium, for example, a solid-state drive (SSD), but is not limited thereto. Any other non-transitory computer readable storage medium can be also utilized as the storage medium 150.

Figure 2:
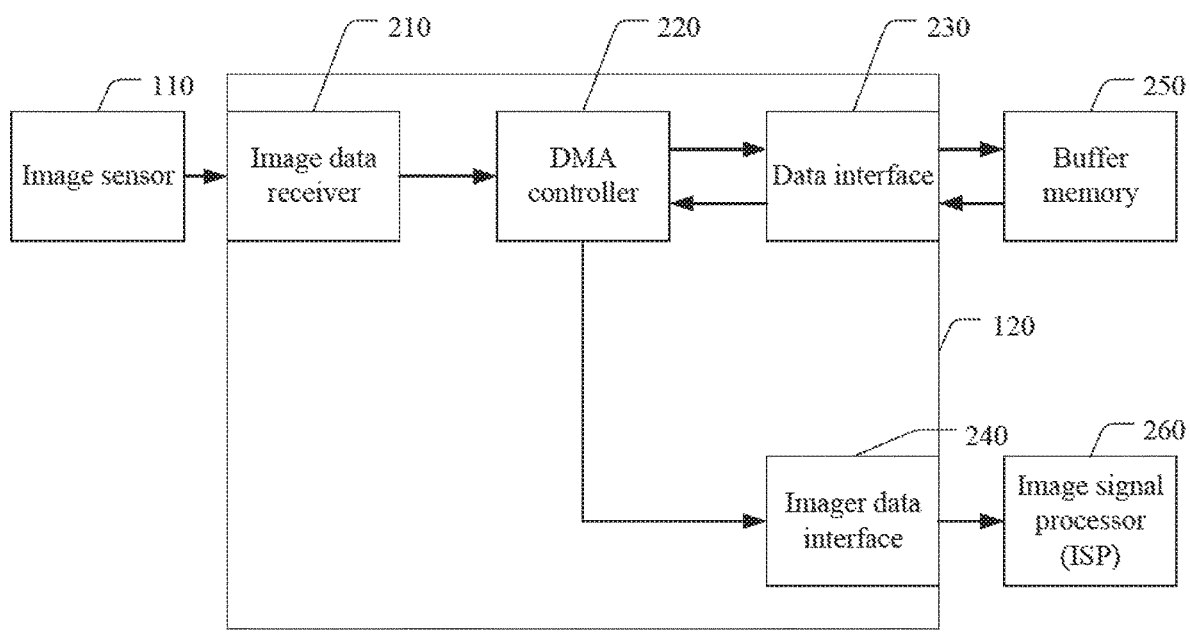
FIG. 2 shows a schematic illustration of an image pre-processing apparatus according to an exemplary embodiment of the invention.

FIG. 2 shows a schematic illustration of an image pre-processing apparatus 120. The image pre-processing apparatus 120 includes an image data receiver 210, a direct memory access (DMA) controller 220, a data interface 230 and an imager data interface 240 required for still image processing. The image data receiver 210 is configured to receive an image frame from the image sensor 110. The image frame has a frame pixel resolution that is substantially equal to the sensor pixel resolution of the image sensor. In other words, the image frame includes image information of all sensor pixels of the active area of the image sensor.

The data interface 230 connects the image pre-processing apparatus 120 to a buffer memory 250 in the image processing apparatus 130. The imager data interface 240 connects the pre-processing apparatus 120 to an ISP 260. The DMA controller 220 is in communication with the image data receiver 210, the data interface 230, and the imager data interface 240, and is configured to store the image frame to the buffer memory 250 via the data interface 230, to receive first and second image subframes from the buffer memory 250 via the data interface 230, and to consecutively transmit the first and second subframes to the ISP 260 via the imager data interface 240.

Figure 3:
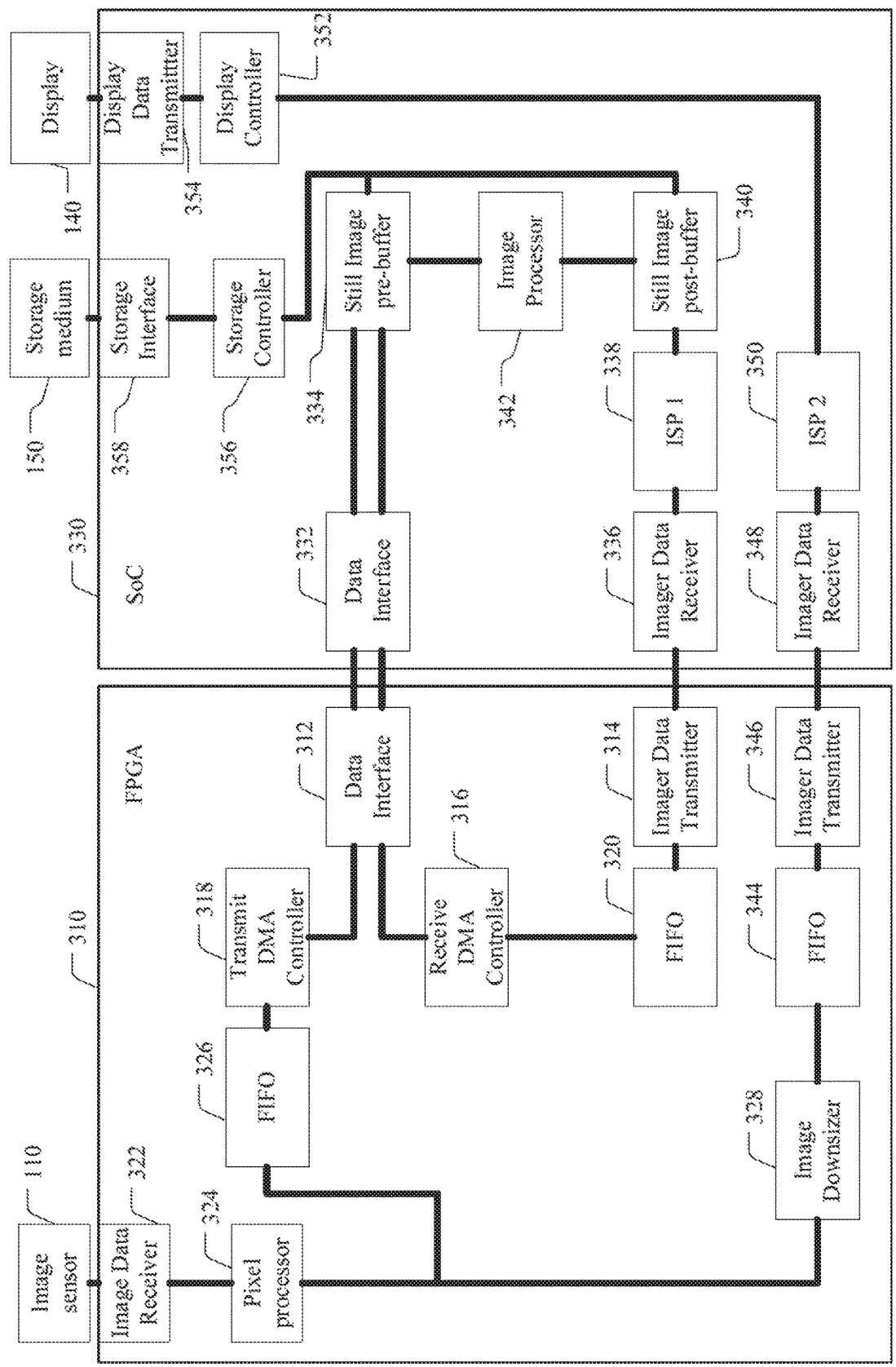
FIG. 3 shows another detailed schematic illustration of the camera system for processing digital images according to an exemplary embodiment of the invention.

Reference is now made to FIG. 3, which shows another more detailed schematic illustration of a camera system 300 for processing digital images according to an exemplary embodiment of the present invention. As shown in FIG. 3, the camera system 300 includes an image pre-processing apparatus 310 to which image sensor 110 is connected, and an image processing apparatus 330. The image processing apparatus 330 is in communication with image pre-processing apparatus 310, display 140, and storage medium 150.

The image processing apparatus 330 in the exemplary embodiment of the camera system 300 shown in FIG. 3 has a system on chip (SoC) architecture and integrates all components necessary to process an image frame received from an image sensor to generate digital images that can be displayed, printed or stored. Thus, image processing apparatus 330 includes image processor 342 which may be implemented, for example, as a digital signal processor (DSP) or a graphics processing unit (GPU). Image processing apparatus 330 further includes a first ISP 338 and data transceiver 332 configured to receive and transmit image frames to be stored in still image pre-buffer 334. In addition, an image data receiver 336 is provided which is configured to receive image subframes to be processed by the ISP 338. The image subframes processed by the ISP 338 are stored in still image post-buffer 340. A display controller 352 is provided which performs operations to allow the image frame captured by the image sensor 110 to be visible on the entire display 140. The display controller 352 is connected to the display 140 via display data transmitter 354. To store still image frames in a graphics image format or image frames in a raw image format in the storage medium 150, a storage controller 356 and a storage interface 358 are provided.

The image pre-processing apparatus 310 includes a data transceiver 312 and a first imager data transmitter 314. Data transceiver 312 and data transceiver 332 form a data interface between the image pre-processing apparatus 310 and the image processing apparatus 330. The data interface 312, 332 may be a high-speed serial computer expansion bus standard interface, such as a Peripheral Component Interconnect Express (PCIe) standard interface, but is not limited thereto.

Like the data interface 312, 332, the imager data transmitter 314 together with the imager data receiver 336 form another interface (i.e., an imager data interface) between the image pre-processing apparatus 310 and the image processing apparatus 330. Data transceiver 312 and imager data transmitter 314 are controlled by receive DMA (RX-DMA) controller 316 and transmit DMA (TX-DMA) controller 318. RX-DMA controller 316 is in communication with imager data transmitter 314 via first in first out (FIFO) buffer 320. Image pre-processing apparatus 310 also includes image data receiver 322 and pixel processor 324 which is in communication with TX-DMA controller 318 via FIFO buffer 326.

The first and second imager data interfaces 314, 336 and 346, 348 according to the exemplary embodiment shown in FIG. 3 are Mobile Industry Processor Interface (MIPI) Camera Serial Interface (CSI) image data interfaces. The imager data interfaces, however, are not limited to MIPI CSI and any other serial interfaces can also be utilized instead.

In the exemplary embodiment shown in FIG. 3, the image pre-processing apparatus 310 is implemented as a field-programmable gate array (FPGA). However, the image pre-processing apparatus 310 may also be implemented as an application-specific integrated circuit (ASIC).

Image pre-processing apparatus 310 further includes image downsizer 328 that is connected via FIFO buffer 344 to a second imager data transmitter 346 that forms together with a second imager data receiver 348 a second imager data interface. The imager data receiver 348 is connected to a second ISP 350.

Both imager data interfaces 314, 336 and 346, 348 can be utilized in still capture mode. The ISPs 338 and 350 are configured upon entering the still capture mode and do not change between live view states and capture states. Still image processing is performed by image pre-processing apparatus 310, ISP 338, and image processor 342.

As discussed above, image sensor 110 is operated in different modes, i.e., in live view mode and in a still capture mode. The first imager data interface 314, 336 together with ISP 338 are only used when still image frames are captured. The second imager data interface 346, 348 together with ISP 348 are only utilized for live view and capture preview.

In both modes, the full active area of the image sensor is used. When an image frame is received from the image sensor 110 by the image data receiver 322 of the image pre-processing apparatus 310, the sensor pixels are corrected by pixel processor 324 in both modes. However, while in still capture mode, all lines and columns are read out from the image sensor 110, in live view mode, lines may be skipped to enable a high frame rate. For example, in live view, the image sensor 110 may output only one quarter of the lines, but all columns. Since the imager data interface 346, 348 may support only a limited data rate, after pixel corrections, the frames may be horizontally resized 4:1 by the image downsizer 328 to accommodate the limited data rate. The image frames in live view are processed by ISP 350 and then asymmetrically scaled to the correct resolution for the display 140.

A typical aspect ratio of the image sensor 110 is 3:2, whereas a typical aspect ratio of the display 140 is 16:9. If, for example, the aspect ratio of the image sensor 110 is 3:2 and the aspect ratio of the display 140 is 16:9, black bars may be added at the display controller 352 so that the entire image frame received from the image sensor 110 is visible on the display 140.

In still capture mode, all lines and columns of the image sensor 110 are read out. For still capture view, pixel correction is performed by pixel processor 324 the same way as for live view mode. However, row skipping is also done by image downsizer 328. As a result, the format of the image data transmitted via imager data interface 346, 348 in still capture mode is the same as in live view mode and no reconfiguration of ISP 350 is required. Still image capture frames are displayed as they are captured by the image sensor 110 at a much lower frame rate than the live view image frames.

Since the live view image frames and still image capture frames usually have different integration times, and captures may be flash illuminated, there may be exposure and white balance changes between the image path flowing through ISP 350 and the image path flowing through ISP 338. Image statistics are collected in ISP 350 and the statistical data is used to determine exposure, white balance, and focus corrections for both live view by ISP 350 and subsequent processing of still image frames by ISP 336.

Imager data interface 314, 336 and ISP 338 are only used when still image frames are captured. During still image capture, full resolution frames are output from the image pre-processing apparatus via data transceivers 312 and 332 to the image processing apparatus 330 and stored in a memory area of still-image pre-buffer 334. When a complete full resolution image frame captured from the image sensor 110 is stored in the still image pre-buffer, pre-ISP processing is performed by the image processor 342. After the pre-ISP processing is complete, pre-ISP processed image frame may be stored in storage medium 150 by storage controller 356 in a raw image format, for example in a digital negative (DNG) format.

Since the ISP 338 has a processing capacity that cannot accommodate the full sensor width, the ISP 338 is not capable of processing the entire image frame generated by the image sensor 110 during still capture mode, the image frame needs to be processed in image subframes, i.e., in tiles or portions of half the image width. For this purpose, the image frame is divided by the image processor 342 into first and second image subframes to be sequentially processed by the ISP 338. Each of the first and the second image subframes has a subframe pixel resolution that is smaller than the sensor pixel resolution and a region in which the first and second image subframes overlap with each other. The subframe pixel resolution is predetermined by a processing capacity of the ISP 338. Thereafter, the first and the second image subframes are consecutively processed by the ISP 338.

In other words, the image data is transferred back over the data interface 312, 332 to the image pre-processing apparatus 310 where it is streamed over the imager data interface 314, 336 to the front end of ISP 338. As each image subframe is processed, it is stored in the still image post-buffer 340 and reassembled into a complete image with a high image quality.

In recent years, the development of image sensors resulted in a fast increase of available pixel resolution of image sensors. At the same time, the development of cost effective ISPs with a corresponding processing power has fallen behind and created a potential bottleneck. The above-described approach significantly improves the quality of the complete image, and it also improves the overall performance of systems performing processing of digital images which include ISPs that are not capable of processing the entire image frame generated by the image sensor 110 during still capture mode, for example. Accordingly, hardware costs can be reduced and the impact of the bottleneck in processing power of ISPs can be minimized.

The image processor 342 performs post-ISP processing on the image subframes in the still-image post-buffer. At this point, a finished image frame in a graphics image format, for example, in the YCbCr tagged image file format (TIFF) or in the joint photographic experts group (JPEG) format may be stored to storage medium 150. It is also possible to compress the finished image frame by a JPEG encoder (not shown) before storing it to the storage medium 150.

The processing of image subframes is asynchronous with the capture of image frames, is somewhat slower than the capture of the image frames and may continue as a background process after the image sensor 110 returns to live view mode. In the case of a burst capture, it takes considerably more time to save up to three files per frame, so the still image pre-buffer 334 empties relatively slowly compared to the fill rate during a burst. When the still image pre-buffer is full, captures will be blocked, even if the user holds the shutter button of the camera. As the buffer is emptied, additional burst frames can be captured.

Figure 4A:
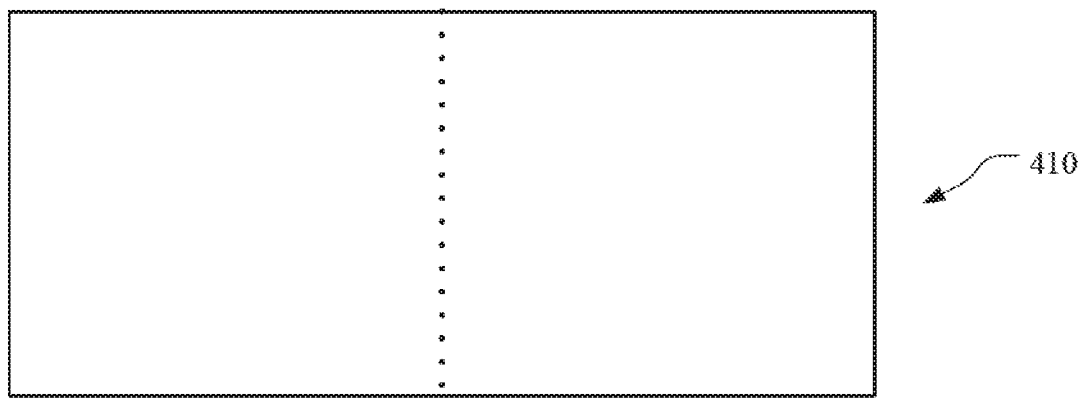
FIG. 4A shows an illustration of an image frame generated by an image sensor.

FIG. 4A shows an illustration of an image frame 410 generated by image sensor 110. Although FIG. 4A shows a frame which has a number of pixel columns (representing the pixel width) of the image frame that is larger than the number of pixel rows (representation the pixel height) of the image frame, any other ratio between width and height is possible. In the exemplary embodiment shown in FIGS. 4A to 4C, the image frame 410 is vertically divided, by way of example, at the dotted line shown in FIG. 4A into first and second image subframes. However, any other division of the image frame 410 is also possible. For example, the image frame 410 may be horizontally divided into three subframes, the image frame 410 may also be further divided vertically, or otherwise, as long as the resulting subframes have an image subframe resolution that can be processed by ISP 338.

Figure 4B:
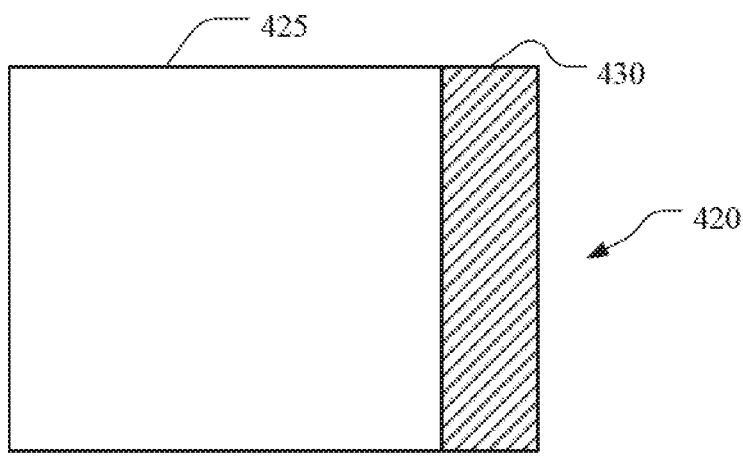
FIG. 4B shows an illustration of a first image subframe generated from the image frame of FIG. 4A.
Figure 4C:
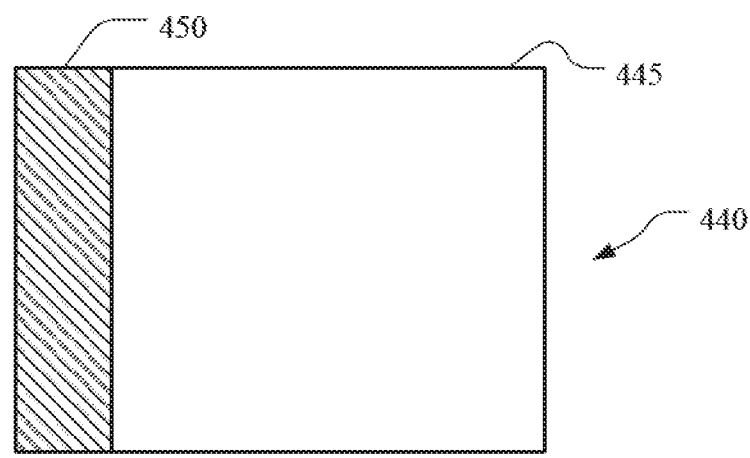
FIG. 4C shows an illustration of a second image subframe generated from the image frame of FIG. 4A.

FIG. 4B shows an illustration of a first image subframe 420 generated from the image frame 410 by image processor 342, and FIG. 4C shows an illustration of a second image subframe 440 generated from the image frame 410 by image processor 342. As shown in FIGS. 4B and 4C, each of the first and second image subframes have a region 430, 450 in which the first and second subframes 420 and 440 overlap with each other.

Figure 5:
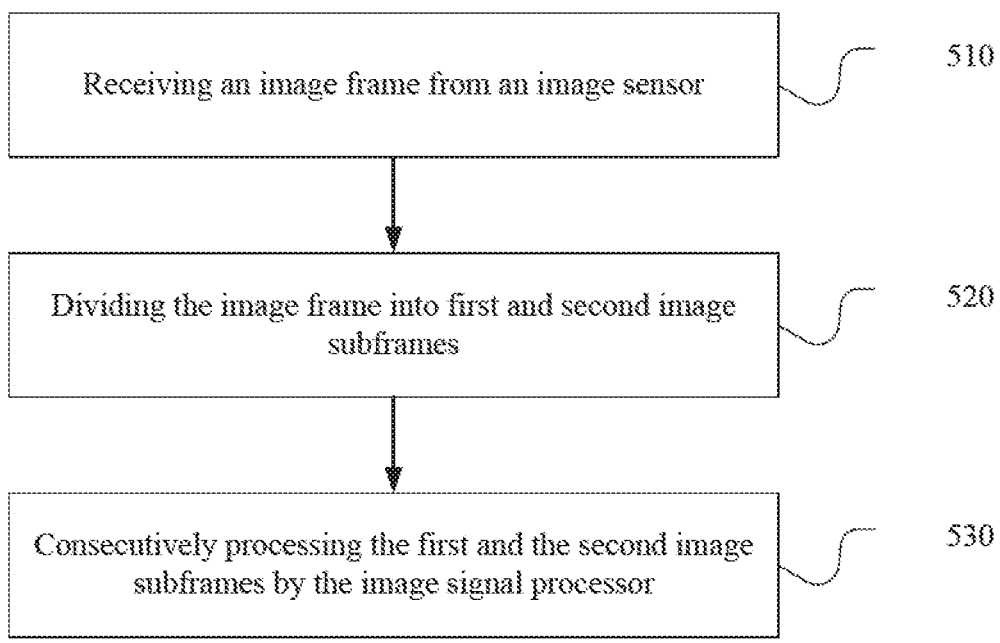
FIG. 5 is a flow chart depicting operations performed by the camera system to process an image frame according to an exemplary embodiment of the invention.

Referring now to FIG. 5 (with reference to FIGS. 3 and 4A to 4C), in which a flow chart is shown illustrating method 500 including operations performed by the camera system 100 to process an image frame 410 according to an exemplary embodiment of the invention. Method 500 begins at step 510 where an image frame 410 is received from image sensor 110, which is operated in still image mode. At 520, the image frame 410 is divided into first and second image subframes 420 and 440, and at 530, the first and second image subframes 420 and 440 are consecutively processed by ISP 338.

Figure 6:
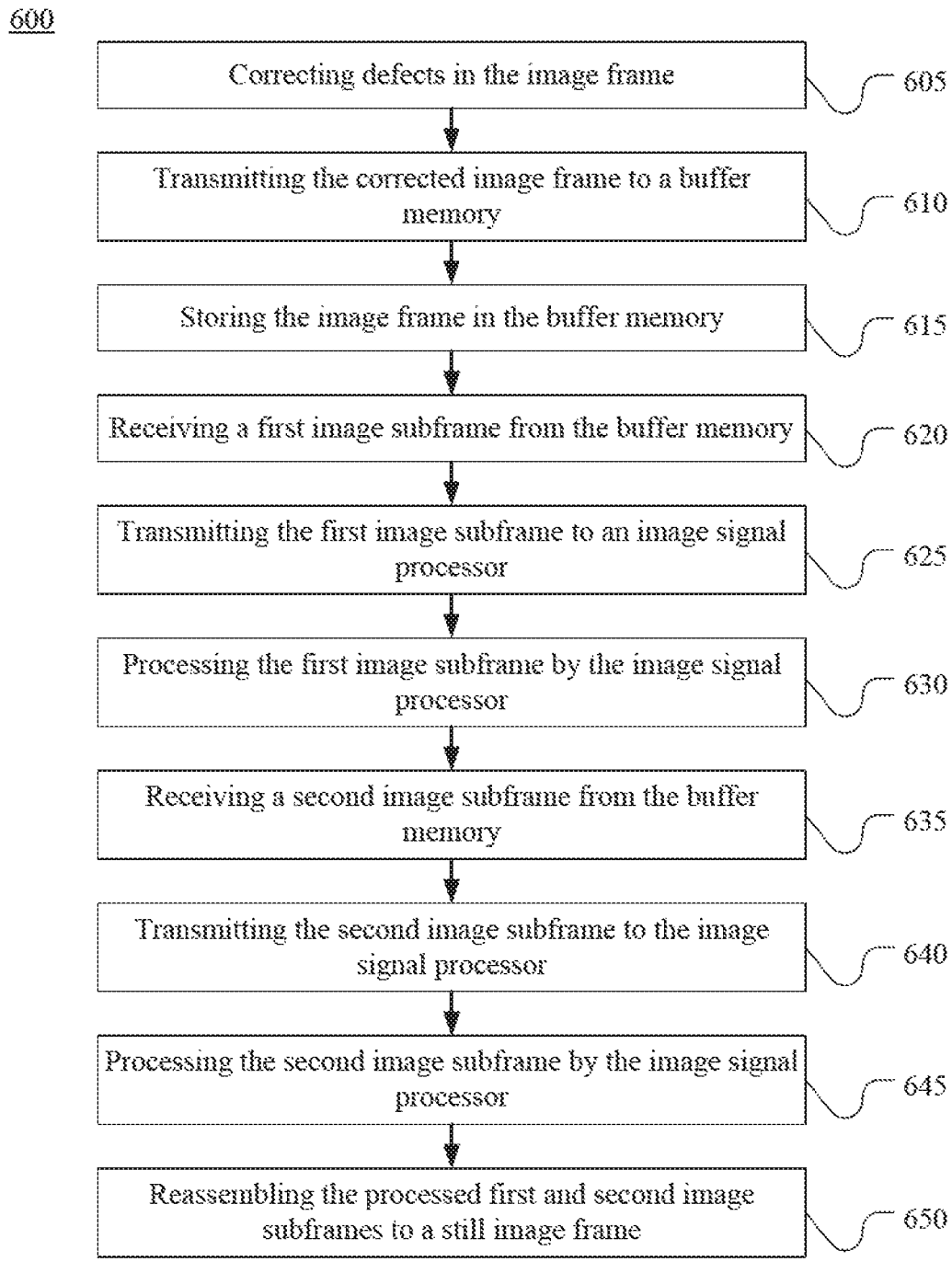
FIG. 6 is a flow chart depicting operations performed by the camera system to generate a still image frame according to an exemplary embodiment of the invention.

Reference is now made to FIG. 6 (with continued reference to FIGS. 3 and 4A to 4C). FIG. 6 is a flow chart showing a method 600 for operating the camera system 100 to generate a still image frame according to an exemplary embodiment of the invention. The method begins at step 605 in which defects in the image frame 410 are corrected by pixel processor 324. The method continues to 610 at which the corrected image frame is transmitted to still image pre-puffer 334 shown in FIG. 3 by TX-DMA controller 318 of image pre-processing apparatus 310. At 615, the image frame 410 is stored in still image pre-buffer 334 and at 620, first image subframe 420 is received by RX-DMA controller 316 of image pre-processing apparatus 310 via data interface 312, 332. The first image subframe 420 is generated by image processor 342 in still image pre-buffer before being transmitted to the image pre-processing apparatus.

The method continues to 625 at which the first image subframe 420 is transmitted via imager data interface 314, 336 by RX-DMA controller 316 to ISP 338 where it is processed at 630 by the ISP 338. At 635, a second image subframe 440 is received from still image pre-buffer 334 by RX-DMA controller 316 of image pre-processing apparatus 310, and at 640, the second image subframe 440 is transmitted to the ISP 338 via imager data interface 314, 336 where it is processed by ISP 338 at 645. The method concludes with 650 at which the processed first and second image subframes 420 and 440, that are stored after being processed by ISP 338 in still image post-buffer 340, are reassembled in Still Image post-buffer 340 to a still image frame. The reassembling or subframe merging in the Still Image post-buffer 340 is configurable and overlapping regions are determined by the image quality parameters and spatial components determined in the ISP 338.

The processing engines of the ISP 338 are configured in such a way that the spatial components in pre-processing and post-processing of the image may minimize the image quality which may affect the subframe processing and the final still image frame.

Noise filtering and other fixed pattern noise removal are performed by the Image Processor 342 on the entire image. The pre-processing block is tuned in such a way that minimal sensor specifics like ADC, pedestal corrections, black offset removal processing, etc., is performed outside the ISP 338 to avoid any spatial artefacts which depend on the full frame capture.

It is understood that the foregoing description is that of the exemplary embodiments of the invention and that various changes and modifications may be made thereto without departing from the spirit and scope of the invention as defined in the appended claims.

What is claimed is:

1. A method for processing digital images, the method comprising:

receiving from an image sensor an image frame at an image pre-processing apparatus, the image frame having a frame pixel resolution substantially equal to a sensor pixel resolution of the image sensor;

storing the image frame by a direct memory access (DMA) controller to a buffer memory via a data interface;

dividing the image frame into first and second image subframes to be sequentially processed by an image signal processor, each of the first and the second image subframes having a subframe pixel resolution smaller than the sensor pixel resolution and a region in which the first and second image subframes overlap with each other, the subframe pixel resolution being predetermined by a processing capacity of the image signal processor; and consecutively processing the first and the second image subframes by the image signal processor received via an imager data interface.

2. The method of claim 1, wherein the dividing comprises horizontally dividing the image frame into the first and second image subframes.

3. The method of claim 1, wherein the dividing comprises vertically dividing the image frame into the first and second image subframes.

4. The method of claim 1, wherein the dividing comprises dividing the image frame into the first image subframe, the second image subframe, and at least one third image subframe.

5. The method of claim 1, wherein:
a first number of pixel rows of the image frame is substantially equal to a second number of pixel rows of the first and second subframes; and
a first number of pixel columns of the image frame is larger than a second number of pixel columns of the first and second subframes.

6. The method of claim 1, further comprising:
correcting defects in the image frame;
transmitting the corrected image frame to the buffer memory via the data interface;
storing the image frame in the buffer memory;
receiving the first image subframe via the data interface from the buffer memory;
transmitting the first image subframe via the imager data interface to the image signal processor;
processing the first image subframe by the image signal processor;
receiving the second image subframe via the data interface from the buffer memory;
transmitting the second image subframe via the imager data interface to the image signal processor upon completion of the processing of the first image subframe by the image signal processor; and
processing the second image subframe by the image signal processor.

7. The method of claim 1, wherein:
the buffer memory is a first buffer memory, and
the method further comprises:
storing the first and second image subframes in a second buffer memory after being processed by the image signal processor;
reassembling the first and second image subframes stored in the second buffer memory to a still image frame by a digital signal processor;
post-processing the still image frame by the digital signal processor; and
storing the post-processed still image frame in a non-transitory computer-readable storage medium in a graphics image format.

8. The method of claim 7, further comprising:
processing the image frame stored in the first buffer memory by the digital signal processor to remove a noise from the image frame; and
storing the image frame processed by the digital signal processor in the non-transitory computer-readable storage medium in a raw image format.

9. The method of claim 8, wherein the non-transitory computer-readable storage medium is a solid-state drive (SSD).

10. The method of claim 8, wherein the graphics image format is selected from the group consisting of a tagged image file format (TIFF) and a joint photographic experts group (JPEG) format.

11. The method of claim 8, wherein the raw image format is a digital negative (DNG) format.

12. The method of claim 8, wherein the digital signal processor is a graphics processing unit (GPU).

13. The method of claim 1, wherein the pre-processing apparatus is a field-programmable gate array (FPGA).

14. The method of claim 1, wherein:
the image signal processor is a first image signal processor,
the imager data interface is a first imager data interface, and
the method further comprises:
resizing the image frame to a capture view image frame by removing at least one of a column and a row of pixels from the image frame;
transmitting the capture view image frame via a second imager data interface to a second image signal processor;
processing the capture view image frame by the second image signal processor; and
displaying the capture view image frame on a display.

15. An image pre-processing apparatus comprising:
an image data receiver configured to receive an image frame from an image sensor, the image frame having a frame pixel resolution substantially equal to a sensor pixel resolution of the image sensor;
a data interface and an imager data interface;
a direct memory access (DMA) controller in communication with the image data receiver, the data interface and the imager data interface, the DMA controller being configured to:
store the image frame to a buffer memory via the data interface;
receive first and second image subframes being generated from the image frame by dividing the image frame into the first and second image subframes to be processed by an image signal processor, each of the first and the second image subframes having a subframe pixel resolution smaller than the sensor pixel resolution and a region in which the first and second image subframes overlap with each other, the subframe pixel resolution being predetermined by a processing capacity of the image signal processor; and
consecutively transmit the first and second subframes to the image signal processor via the imager data interface.

16. The image pre-processing apparatus of claim 15, wherein the image frame is horizontally divided into the first and second image subframes.

17. The image pre-processing apparatus of claim 15, wherein the image frame is vertically divided into the first and second image subframes.

18. The image pre-processing apparatus of claim 15, wherein the image frame is divided into the first image subframe, the second image subframe, and at least one third image subframe.

19. The image pre-processing apparatus of claim 15, further comprising:
a pixel processor configured to correct defects in the image frame received from the image sensor via the image data receiver.

20. The image pre-processing apparatus of claim 15, wherein:

the image signal processor is a first image signal processor, the imager data interface is a first imager data interface, the image pre-processing apparatus further comprises an image downsizer in communication with the pixel processor and configured to:

receive the corrected image frame from the pixel processor;

resize the corrected image frame to a capture view image frame by removing at least one of a column and a row of pixels from the corrected image frame; and transmit the capture view image frame via a second imager data interface to a second image signal processor to be processed and displayed on a display.

21. The image pre-processing apparatus of claim 15, wherein the image pre-processing apparatus is a field-programmable gate array (FPGA).

22. A camera system for processing digital images, the system comprising:

an image sensor;

an image pre-processing apparatus in communication with the image sensor;

an image processing apparatus in communication with the pre-processing apparatus and including a buffer memory and an image signal processor; and a display connected to the image processing apparatus;

the image pre-processing apparatus comprising:

an image data receiver configured to receive an image frame from the image sensor, the image frame having a frame pixel resolution substantially equal to a sensor pixel resolution of the image sensor;

a data interface and an imager data interface;

a direct memory access (DMA) controller in communication with the image data receiver, the data interface and the imager data interface, the DMA controller being configured to:

store the image frame to the buffer memory via the data interface;

receive first and second subframes being generated from the image frame; and consecutively transmit the first and second subframes to the image signal processor via the imager data interface.

23. The camera system of claim 22, wherein the image processing apparatus further comprises a digital signal processor configured to divide the image frame stored in the buffer memory into the first and second image subframes to be processed by the image signal processor, each of the first and the second image subframes having a subframe pixel resolution smaller than the sensor pixel resolution and a region in which the first and second image subframes overlap with each other, the subframe pixel resolution being predetermined by a processing capacity of the image signal processor.

24. The camera system of claim 23, further comprising:

a non-transitory computer-readable storage medium connected to the image processing apparatus;

wherein:

the buffer memory is a first buffer memory;

the image processing apparatus further comprises a second buffer memory in which the first and second image subframes are stored after being processed by the image signal processor;

the digital signal processor is configured to:

reassemble the first and second image subframes stored in the second buffer memory to a still image frame;

post-process the still image frame; and store the post-processed still image frame in the non-transitory computer-readable storage medium in a graphics image format.

25. The camera system of claim 24, wherein the digital signal processor is further configured to:

process the image frame stored in the first buffer memory by the digital signal processor to remove noise from the image frame, and store the image frame processed by the digital signal processor in the non-transitory computer-readable storage medium in a raw image format.

26. The camera system of claim 24, wherein the non-transitory computer-readable storage medium is a solid-state drive (SSD).

27. The camera system of claim 24, wherein the graphics image format is selected from the group consisting of a tagged image file format (TIFF) and a joint photographic experts group (JPEG) format.

28. The camera system of claim 24, wherein the raw image format is a digital negative (DNG) format.

29. The camera system of claim 24, wherein the digital signal processor is a graphics processing unit (GPU).

30. The camera system of claim 22, wherein the image pre-processing apparatus is a field-programmable gate array (FPGA).

31. The camera system of claim 22, wherein:

the image signal processor is a first image signal processor, the image processing apparatus further comprises a second image signal processor;

the imager data interface is a first imager data interface; and the image pre-processing apparatus further comprises a second imager data interface and an image downsizer, the image downsizer being in communication with the second imager data interface and configured to:

resize the image frame to a capture view image frame by removing at least one of a column and a row of pixels from the image frame; and transmit the capture view image frame via the second imager data interface to the second image signal processor, the second image signal processor being configured to process the capture view image frame and to forward the processed capture view image frame to the display.

32. The camera system of claim 22, wherein:

the images sensor is at least one of a charge-coupled device (CCD) sensor, a complementary metal-oxide-semiconductor (CMOS) sensor, and an N-type metal-oxide-semiconductor (NMOS) sensor; and the image sensor has a pixel resolution that is larger than the processing capacity of the image signal processor.

* * * * *